(12) United States Patent
Frey et al.

(10) Patent No.: US 7,585,799 B2
(45) Date of Patent: Sep. 8, 2009

(54) MICROSPHERES HAVING A HIGH INDEX OF REFRACTION

(75) Inventors: Matthew H. Frey, Cottage Grove, MN (US); Billy J. Frederick, Jr., Woodbury, MN (US); Terrance L. Bescup, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/356,388

(22) Filed: Jan. 20, 2009

(65) Prior Publication Data

US 2009/0123754 A1      May 14, 2009

Related U.S. Application Data

(60) Division of application No. 11/044,681, filed on Jan. 27, 2005, now Pat. No. 7,524,779, which is a continuation-in-part of application No. 10/458,955, filed on Jun. 11, 2003, now abandoned.

(51) Int. Cl.
| | |
|---|---|
| *C03C 12/02* | (2006.01) |
| *C03C 12/00* | (2006.01) |
| *C03C 10/00* | (2006.01) |
| *C03C 10/02* | (2006.01) |
| *C09D 1/00* | (2006.01) |
| *C09D 4/00* | (2006.01) |
| *C09D 5/00* | (2006.01) |
| *C09D 11/00* | (2006.01) |
| *C09K 3/00* | (2006.01) |

(52) U.S. Cl. .............................. 501/34; 501/33; 501/2; 501/10; 106/31.04
(58) Field of Classification Search .................. 501/33, 501/34, 2, 10; 106/31.04
See application file for complete search history.

(56) References Cited

U.S. PATENT DOCUMENTS

| | | | |
|---|---|---|---|
| 2,354,018 A | 7/1944 | Heltzer et al. |
| 2,713,286 A | 7/1955 | Taylor |
| 2,726,161 A | 12/1955 | Beck et al. |
| 2,790,723 A | 4/1957 | Stradley et al. |
| 2,842,446 A | 7/1958 | Beck et al. |
| 2,853,393 A | 9/1958 | Beck et al. |
| 2,870,030 A | 1/1959 | Stradley et al. |

(Continued)

FOREIGN PATENT DOCUMENTS

DE        209 431        9/1984

(Continued)

OTHER PUBLICATIONS

Ceram. Engr. Sci. Proc., 16, 1015-25 (1995), "Melt Extraction and Properties of $ZrO_2$-$Al_2$-$O_3$-Based Fibers", pp. 1015-1025.

(Continued)

*Primary Examiner*—Karl E Group
*Assistant Examiner*—Noah S Wiese
(74) *Attorney, Agent, or Firm*—Sandra K. Nowak

(57) ABSTRACT

The present disclosure relates to microspheres (i.e., beads) having a high index of refraction. The disclosure also relates to retroreflective articles, and in particular pavement markings, comprising such microspheres.

25 Claims, 1 Drawing Sheet

U.S. PATENT DOCUMENTS

| | | | |
|---|---|---|---|
| 2,873,197 A | 2/1959 | McMullen | |
| 2,924,533 A | 2/1960 | McMullen | |
| 2,960,594 A | 11/1960 | Thorpe | |
| 2,963,378 A | 12/1960 | Palmquist et al. | |
| 3,145,114 A | 8/1964 | Rindone | |
| 3,149,016 A * | 9/1964 | Tung et al. | 428/402 |
| 3,228,897 A | 1/1966 | Nellessen | |
| 3,293,051 A | 12/1966 | Searight et al. | |
| 3,294,558 A | 12/1966 | Searight | |
| 3,294,559 A | 12/1966 | Searight et al. | |
| 3,323,888 A | 6/1967 | Searight et al. | |
| 3,410,185 A | 11/1968 | Harrington | |
| 3,416,936 A | 12/1968 | Sproul, Jr. | |
| 3,419,403 A | 12/1968 | Searight et al. | |
| 3,432,314 A | 3/1969 | Mazdiyasni et al. | |
| 3,493,403 A | 2/1970 | Tung et al. | |
| 3,499,857 A | 3/1970 | Searight | |
| 3,523,029 A | 8/1970 | Searight | |
| 3,560,074 A | 2/1971 | Searight et al. | |
| 3,645,933 A | 2/1972 | Flint | |
| 3,684,536 A | 8/1972 | Hoffman | |
| 3,709,706 A | 1/1973 | Sowman | |
| 3,749,763 A | 7/1973 | Scammon, Jr. et al. | |
| 3,795,524 A | 3/1974 | Sowman | |
| 3,864,113 A | 2/1975 | Dumbaugh, Jr. | |
| 3,915,771 A | 10/1975 | Gatzke et al. | |
| 3,964,821 A | 6/1976 | Eigenmann | |
| 4,056,602 A | 11/1977 | Matovich | |
| 4,082,427 A * | 4/1978 | Nakashima | 359/540 |
| 4,095,974 A | 6/1978 | Matovich | |
| 4,106,947 A | 8/1978 | Recasens et al. | |
| 4,137,086 A | 1/1979 | Potter et al. | |
| 4,141,742 A | 2/1979 | Nakajima | |
| 4,192,576 A | 3/1980 | Tung et al. | |
| 4,248,932 A | 2/1981 | Tung et al. | |
| 4,367,919 A | 1/1983 | Tung et al. | |
| 4,526,874 A | 7/1985 | Grabowski geb. Marszalek | |
| 4,564,556 A | 1/1986 | Lange | |
| 4,607,697 A | 8/1986 | Urffer | |
| 4,621,936 A | 11/1986 | Hansson et al. | |
| 4,721,743 A | 1/1988 | Cavitt et al. | |
| 4,734,389 A | 3/1988 | Grabowski et al. | |
| 4,758,469 A | 7/1988 | Lange | |
| 4,772,511 A | 9/1988 | Wood et al. | |
| 4,837,069 A | 6/1989 | Bescup et al. | |
| 4,931,414 A | 6/1990 | Wood et al. | |
| 4,988,555 A | 1/1991 | Hedblom | |
| 5,227,221 A | 7/1993 | Hedblom | |
| 5,268,789 A | 12/1993 | Bradshaw | |
| 5,286,682 A | 2/1994 | Jacobs et al. | |
| 5,310,278 A | 5/1994 | Kaczmarczik et al. | |
| 5,502,012 A | 3/1996 | Bert et al. | |
| 5,576,097 A | 11/1996 | Wyckoff | |
| 5,670,209 A | 9/1997 | Wyckoff | |
| 5,674,616 A | 10/1997 | Balcar | |
| 5,698,482 A | 12/1997 | Frank et al. | |
| 5,716,706 A | 2/1998 | Morris | |
| 5,774,265 A | 6/1998 | Mathers et al. | |
| 5,777,791 A | 7/1998 | Hedblom | |
| 5,853,851 A | 12/1998 | Morris | |
| 6,132,132 A | 10/2000 | Pirotta et al. | |
| 6,153,127 A | 11/2000 | Nakamura et al. | |
| 6,166,106 A | 12/2000 | Purgett et al. | |
| 6,235,667 B1 | 5/2001 | Paloschi et al. | |
| 6,245,700 B1 | 6/2001 | Budd et al. | |
| 6,335,083 B1 | 1/2002 | Kasai et al. | |
| 6,365,262 B1 | 4/2002 | Hedblom et al. | |
| 6,376,574 B1 | 4/2002 | Helmer et al. | |
| 6,451,874 B1 | 9/2002 | Purgett et al. | |
| 6,461,988 B2 | 10/2002 | Budd et al. | |
| 6,479,417 B2 | 11/2002 | Frey et al. | |
| 6,511,739 B2 | 1/2003 | Kasai et al. | |
| 2004/0259713 A1 | 12/2004 | Frey | |

FOREIGN PATENT DOCUMENTS

| | | |
|---|---|---|
| DE | 242 038 | 1/1987 |
| FR | 1404190 | 11/1965 |
| GB | 2 265 367 | 9/1993 |
| JP | 51-55428 | 5/1976 |
| JP | 53-22513 | 3/1978 |
| JP | 53-88815 | 8/1978 |
| JP | 53-102325 | 9/1978 |
| JP | 54-6241 | 3/1979 |
| JP | 55-20254 | 2/1980 |
| JP | 55-20256 | 2/1980 |
| JP | 55-126547 | 9/1980 |
| JP | 55-126548 | 9/1980 |
| JP | 56-41852 | 4/1981 |
| JP | 57-38342 | 3/1982 |
| JP | 58-15067 | 1/1983 |
| JP | 60-22656 | 6/1985 |
| JP | 60-215549 | 10/1985 |
| JP | 61-68349 | 4/1986 |
| JP | 61-270235 | 11/1986 |
| JP | 61-59262 | 12/1986 |
| JP | 1-278434 | 11/1989 |
| JP | 5-85771 | 4/1993 |
| JP | 2610004 | 2/1997 |
| JP | 9-142872 | 6/1997 |
| JP | 9-188544 | 7/1997 |
| JP | 9-278480 | 10/1997 |
| JP | 2002-308645 | 10/2002 |
| SU | 358281 | 12/1972 |
| WO | 96/33139 | 10/1996 |
| WO | 98/47830 | 10/1998 |

OTHER PUBLICATIONS

Ceram. Engr. Sci. Proc., 16(2) 84-95 (1995), "Fused Cast AZS Adapted for Superstructure Applications in Today's Glass Furnaces", pp. 84-95.

Journal De Physique, Colloque CI, supp. au n. 2, Tome 47, fevrier 1986 pp. C1-473—C1-477, "Rapid Quenching of Melts in the System $ZrO_2$-$SiO_2$-$Al_2O_3$".

F. Donald Bloss "An Introduction to the Methods of Optical Crystallography,"Holt, Rinehart and Winston, New York pp. 47-55 (1961).

Introduction to Ceramics, $2^{nd}$ Ed., Kingery et al., 1960, pp. 666-669.

Glass-Ceramics and Photo-Sitalls, Anatolii I. Berezhnoi, 1970, p. 3, 278.

Engineered Materials Handbook, vol. 4, Ceramics and Glasses, 1991, Phase- Separated Glasses and Glass-Ceramics, Linda Pickney.

Journal of Non-Crystalline Solids 100 (1988)298-302, Toughened Glass-Ceramics Containing $ZrO_2$ and $Al_2O_3$ Prepared by the Sol-Gel Process From Metal Alkoxides.

Materials Science Research (1984), vol. 17, pp. 213-223, "Plasma Melting of Selected Compositions in the $Al_2O_3$-$ZrO_2$ System", James Portugal and David Pye.

U.S. Appl. No. 11/044681, filed Jan. 27, 2005, issued as U.S. Patent No. 7,524,779.

* cited by examiner

MICROSPHERES HAVING A HIGH INDEX OF REFRACTION

RELATED APPLICATIONS

This application is a division of U.S. patent application Ser. No. 11/044,681, filed Jan. 27, 2005(now U.S. Pat. No. 7,524,779), which is a continuation-in-part of U.S. patent application Ser. No. 10/458,955 filed Jun. 11, 2003 (now abandoned).

FIELD OF THE DISCLOSURE

The present disclosure relates to microspheres (i.e., beads) having a high index of refraction. The disclosure also relates to retroreflective articles, and in particular pavement markings, comprising such microspheres.

BACKGROUND

Transparent glass and glass-ceramic microspheres (i.e., beads) are used as optical elements for retroreflective sheeting and pavement markings. Such microspheres can be produced, for example, by melting methods. Such melting methods may include melting a raw material composition in the form of particulate material. The melted particles can be quenched, in air or water for example, to give solid beads. Optionally, quenched particles can be crushed to form particles of a smaller desired size for the final beads. The crushed particles can be passed through a flame having a temperature sufficient to melt and spheroidize them. For many raw material compositions this is a temperature of about 1500° C. to about 2000° C. Alternatively, the melted raw material composition can be poured continuously into a jet of high velocity air. Molten droplets are formed as the jet impinges on the liquid stream. The velocity of the air and the viscosity of the melt are adjusted to control the size of the droplets. The molten droplets are rapidly quenched, in air or water for example, to give solid beads. Beads formed by such melting methods are normally composed of a vitreous material that is essentially completely amorphous (i.e., noncrystalline), and hence, the beads are often referred to as "vitreous," "amorphous," or simply "glass" beads or microspheres.

One exemplary patent that relates to microspheres is U.S. Pat. No. 6,335,083 (Kasai et al.), which relates to transparent solid, fused microspheres. In one embodiment, the microspheres contain alumina, zirconia, and silica in a total content of at least about 70% by weight, based on the total weight of the solid, fused microspheres, wherein the total content of alumina and zirconia is greater than the content of silica, and further wherein the microspheres have an index of refraction of at least about 1.6 and are useful as lens elements.

Other exemplary patents include U.S. Pat. Nos. 6,245,700 and 6,461,988 (Budd et al.) that relate to transparent, solid microspheres that contain titania plus alumina, zirconia, and/or silica in a total content of at least about 75% by weight, based on the total weight of the solid, microspheres, wherein the total content of alumina, zirconia and titania is greater than the content of silica.

Although, the microspheres of U.S. Pat. No. 6,335,083 (Kasai et al.) and U.S. Pat. Nos. 6,245,700 and 6,461,988 (Budd et al.) exhibit sufficient transparency and mechanical properties for use as retroreflective lens elements for retroreflective articles such as pavement markings, industry would find advantage in microsphere compositions having improved properties and methods of making such microspheres.

SUMMARY

In one aspect, the present disclosure relates to fused microspheres having a glass-ceramic structure. The microspheres have an index of refraction of at least 2.30 (e.g., at least 2.35, at least 2.40). The microspheres comprise at least 60 wt-% titania, calcia, and at least one alkaline each metal oxide other than calcia. The amount of calcia and at least one other alkaline metal oxide is preferably at least 10 wt-% and may range up to about 35 wt-%. The calcia is preferably present in an amount of at least 2 wt-%.

In one aspect, the microspheres comprise a total content of titania, zirconia, and baria of at least 70 wt-% (e.g., at least 80 wt-%, at least 90 wt-%) based on the total weight of the microspheres.

In another aspect, the microspheres further comprise at least 5 wt-% zirconia.

In another aspect, the microspheres comprise at least 4 wt-% CaO and at least 4 wt-% BaO.

In another aspect, the microspheres comprise at least 4 wt-% CaO, at least 4 wt-% BaO, and at least 4 wt-% SrO.

In another aspect, the microspheres further comprise up to about 10 wt-% zinc oxide.

In another aspect, the microspheres comprise about 60 wt-% to about 75 wt-% of titania, about 5 wt-% to about 25 wt-% of zirconia, about 5 wt-% to about 15 wt-% baria, about 5 wt-% to about 15 wt-% calcia, and optionally up to about 5 wt-% zinc oxide.

In another aspect, the microspheres comprise about 65 wt-% to about 70 wt-% of titania, about 10 wt-% to about 20 wt-% of zirconia, about 5 wt-% to about 10 wt-% baria, about 5 wt-% to about 10 wt-% calcia, and optionally up to about 5 wt-% zinc oxide.

In another aspect, the microspheres comprise about 65 wt-% to about 70 wt-% of titania, about 10 wt-% to about 20 wt-% of zirconia, about 5 wt-% to about 12 wt-% baria, about 5 wt-% to about 12 wt-% calcia, and optionally up to about 5 wt-% zinc oxide.

In another aspect, the microspheres comprise about 65 wt-% to about 70 wt-% of titania, about 12 wt-% to about 18 wt-% of zirconia, about 6 wt-% to about 10 wt-% baria, about 6 wt-% to about 10 wt-% calcia, and optionally up to about 5 wt-% zinc oxide.

In each aspect, the microspheres are preferably transparent. Further, the microspheres preferably have a diameter greater than 100 microns (e.g., greater than 150 microns).

The nanoscale crystals of the glass-ceramic structure have dimensions less than about 100 nanometers. The nanoscale crystals preferably comprise at least 20 volume % of the microspheres (e.g., at least 50 volume %). The microspheres may comprise crystals greater than about 100 nanometers in dimension provided such crystals comprise less than 20 volume % of the microspheres. The microspheres are preferably transparent.

In other aspects the disclosure relates to retroreflective articles comprising a binder and the glass-ceramic microspheres of the disclosure.

In another aspect, the disclosure relates to a retroreflective element comprising a core (e.g., ceramic) and the microspheres of the disclosure partially embedded in the core.

In another aspect, the disclosure relates to pavement markings comprising a binder and the microspheres and/or the reflective elements.

In yet another aspect, the disclosure relates to a method of producing microspheres comprising providing at least one of the previously described starting compositions, melting the composition to form molten droplets, cooling the molten droplet to form quenched fused microspheres, and heating the quenched fused microspheres to give glass-ceramic microspheres with index of refraction of at least 2.30.

DETAILED DESCRIPTION OF PREFERRED EMBODIMENTS

Figure 1:
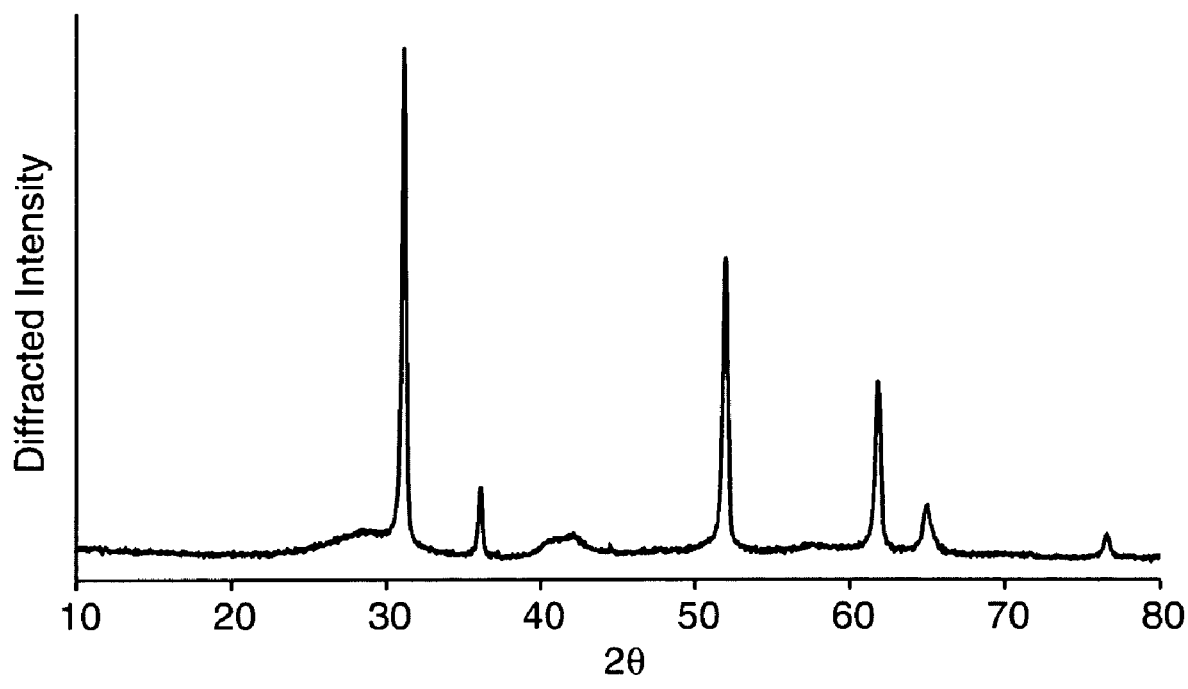
FIG. 1 is an X-ray diffraction plot for exemplary glass-ceramic beads of the disclosure.

The present disclosure provides glass-ceramic microspheres (i.e., beads) of various compositions having a high index of refraction. The microspheres typically comprise titania ($TiO_2$), zirconia ($ZrO_2$), and a mixture of two or more alkaline earth metal oxides, wherein one of the alkaline earth metal oxides is calcia.

Beads of the present disclosure are particularly useful as lens elements in retroreflective articles. Transparent beads according to the present disclosure have an index of greater than 2.30, preferably of at least about 2.35, and even more preferably of at least about 2.40. For retroreflective applications in water or a wet environment, the beads preferably have a high index of refraction. An advantage of the compositions of the present disclosure is the ability to provide microspheres having a relatively higher index of refraction and thus enhanced wet reflectivity.

Although such high index of refraction has been demonstrated in the past for glass beads, such bead compositions usually contain relatively high concentrations of PbO, CdO or $Bi_2O_3$. The presence of such high concentrations of $Bi_2O_3$ leads to undesirable yellow coloration. Also, $Bi_2O_3$ sources are generally more expensive than sources of most other metal oxides, and therefore it is preferred not to manufacture microspheres with high concentrations of $Bi_2O_3$. PbO and CdO may be included to raise the index of refraction. However, these component are typically avoided.

Although such high index of refraction glass beads have been demonstrated in the past for compositions comprising large amounts of titania as well, such beads were prepared with a plasma torch that provided a fusion temperature reported to be in excess of 5000° C. Also, such beads were prepared from particles less than 90 microns in size. Finally, such transparent fused beads were formed by rapidly quenching in water. Particles less than 90 microns in size are able to be heated rapidly in a plasma torch, and can be quenched at higher rates than larger particles, due to heat transfer limitations. Thus, compositions that can be heated and quenched into a transparent bead less than 90 microns in diameter, using a plasma torch and water quenching, are often not suitable for preparation of transparent beads with larger sizes, using lower temperature fusion equipment and air-quenching. In many applications, it is desired to prepare quenched fused beads with size larger than 90 microns. For practical and low-cost manufacturing, it is desirable to use compositions that take advantage of equipment that provides a fusion temperature substantially less than 5000° C. It is also desirable to use equipment that provides only air-quenching. Thus, the present disclosure provides compositions with exceptional melting and glass-forming properties, making them useful for forming beads with size ranging above 90 microns (e.g., 100 microns, 150 microns, 200 microns), using combustion flame fusion processes and air-quenching.

The terms "beads" and "microspheres" are used interchangeably and refer to particles that are substantially, although perhaps not exactly, spherical. The term "solid" refers to beads that are not hollow, i.e., free of substantial cavities or voids. For use as lens elements, the beads are preferably spherical and preferably solid. Solid beads are typically more durable than hollow beads, particularly when exposed to freeze-thaw cycles.

The microspheres described herein are preferably transparent. The term "transparent" means that the beads when viewed under an optical microscope (e.g., at 100×) have the property of transmitting rays of visible light so that bodies beneath the beads, such as bodies of the same nature as the beads, can be clearly seen through the beads when both are immersed in oil of approximately the same refractive index as the beads. Although the oil should have an index of refraction approximating that of the beads, it should not be so close that the beads seem to disappear (as they would in the case of a perfect index match). The outline, periphery, or edges of bodies beneath the beads are clearly discernible. The microspheres described herein are prepared from a melt process. Microspheres prepared from a melt process are described herein as "fused." For ease in manufacturing, it is preferred that the microsphere composition exhibits a relatively low liquidus temperature, such as less than about 1700° C., and preferably less than about 1600° C. Typically the liquidus temperature is less than about 1500° C.

Upon initial formation from a melt, beads are formed that are substantially amorphous yet can contain some crystallinity. The compositions preferably form clear, transparent glass microspheres when quenched. Upon further heat treatment, the beads can develop crystallinity in the form of a glass-ceramic structure, i.e., microstructure in which crystals have grown from within an initially amorphous structure, and thus become glass-ceramic beads. Upon heat treatment of quenched beads, the beads can develop crystallinity in the form of a nanoscale glass-ceramic structure, i.e., microstructure in which crystals less than about 100 nanometers in dimension have grown from within an initially amorphous structure, and thus become glass-ceramic beads. A nanoscale glass-ceramic microstructure is a microcrystalline glass-ceramic structure comprising nanoscale crystals. For the purposes of the present disclosure, microspheres exhibiting X-ray diffraction consistent with the presence of a crystalline phase are considered glass-ceramic microspheres. An approximate guideline in the field is that materials comprising less than about 1 volume % crystals may not exhibit detectable crystallinity in typical powder X-ray diffraction measurements. Such materials are often considered "X-ray amorphous" or glass materials, rather than ceramic or glass-ceramic materials. Microspheres comprising crystals that are detectable by X-ray diffraction measurements typically necessary to be present in an amount greater than or equal to 1 volume % for detectability, are considered glass-ceramic microspheres, for the purposes of the present disclosure. X-ray diffraction data can be collected using a Philips Automated Vertical Diffractometer with Type 150 100 00 Wide Range Goniometer, sealed copper target X-ray source, proportional detector, variable receiving slits, 0.2° entrance slit, and graphite diffracted beam monochromator (Philips Electronics Instruments Company, Mahwah, N.J.), with measurement settings of 45 kV source voltage, 35 mA source current, 0.04° step size, and 4 second dwell time. Likewise as used herein "glass microspheres" refers to microspheres having less than 1 volume % of crystals. Preferably, the glass-ceramic microspheres comprise greater than 10 volume % crystals. More preferably, the glass-ceramic microspheres comprise greater than 25 volume % crystals. Most preferably, the glass-ceramic microspheres comprise greater than 50 volume % crystals.

In preferred embodiments, the microspheres form a microcrystalline glass-ceramic structure via heat treatment yet remain transparent. For good transparency, it is preferable that the microspheres comprise little or no volume fraction of crystals greater than about 100 nanometers in dimension. Preferably, the microspheres comprise less than 20 volume % of crystals greater than about 100 nanometers in dimension, more preferably less than 10 volume %, and most preferably less than about 5 volume %. Preferably, the size of the crystals in the crystalline phase is less than about 20 nanometers (0.02 micron) in their largest linear dimension. Crystals of this size typically do not scatter visible light effectively, and therefore do not decrease the transparency significantly.

Beads of the disclosure can be made and used in various sizes. It is uncommon to deliberately form beads smaller than 10 microns in diameter, though a fraction of beads down to 2 microns or 3 microns in diameter is sometimes formed as a by-product of manufacturing larger beads. Accordingly, the beads are preferably at least 20 microns, (e.g., at least 50 microns, at least 100 microns, at least 150 microns.) Generally, the uses for high index of refraction beads call for them to be less than about 2 millimeters in diameter, and most often less than about 1 millimeter in diameter (e.g., less than 750 microns, less than 500 microns, less than 300 microns).

The components of the beads are described as oxides, i.e., the form in which the components are presumed to exist in the completely processed glass and glass-ceramic beads as well as retroreflective articles, and the form that correctly accounts for the chemical elements and the proportions thereof in the beads. The starting materials used to make the beads may include some chemical compound other than an oxide, such as a carbonate. Other starting materials become modified to the oxide form during melting of the ingredients. Thus, the compositions of the beads of the present disclosure are discussed in terms of a theoretical oxide basis.

The compositions described herein are reported on a theoretical oxide basis based on the amounts of starting materials used. These values do not necessarily account for fugitive materials (e.g., fugitive intermediates) that are volatilized during the melting and spheroidizing process. Typically, for example, boria ($B_2O_3$), alkali metal oxides, and zinc oxide, are somewhat fugitive. Thus, upon analysis of the finished bead, as much as 5% of the original amount of boria and/or alkali metal oxide added to make the final microspheres may be lost during processing. Bismuth oxide can also volatilize depending on the temperature(s) employed. As is conventional, however, all components of the final microspheres are calculated based on the amounts of the nonvolatilized starting materials and the total weight of the glass forming composition, and are reported in weight percents of oxides based on a theoretical basis.

Microspheres according to the present disclosure comprise at least 60 wt-%, and more preferably at least 65 wt-% titania. The amount of titania in the glass-ceramic microspheres of the disclosure ranges up to 92 wt-%. The amount of titania for the glass-ceramic microspheres is preferably less than 80 wt-%. In one embodiment, the amount of titania ranges from about 65 wt-% to about 70 wt-%.

Titania is a high index of refraction metal oxide with a melting point of 1840° C., and is typically used because of its optical and electrical properties, but not generally for hardness or strength. Similar to zirconia, titania is a strong nucleating agent known to cause crystallization of glass compositions. Despite its high individual melting point, as a component in a mixture of certain oxides, titania can lower the liquidus temperature, while significantly raising the index of refration of microspheres comprising such mixtures of oxides. Compositions of the present disclosure comprising titania and optionally zirconia provide relatively low liquidus temperatures, very high index of refraction values, high crystallinity when heat-treated appropriately, useful mechanical properties, and high transparency.

The glass microspheres described herein optionally, yet typically comprise at least 5 wt-% zirconia. The amount of zirconia ranges up to 30 wt-%. In one embodiment, the amount of zirconia ranges from about 10 wt-% to about 20 wt-% (e.g., 12 wt-% to about 18 wt-%). Generally, the zirconia contributes chemical and mechanical durability as well as contributes to the high index of refraction of the preferred beads. Surprisingly, additions of zirconia to compositions containing titania in excess of 60 wt-% and alkaline earth oxide lead to excellent glass-forming properties. Also surprisingly, compositions comprising zirconia and alkaline earth oxide together with titania in excess of 60 wt-%, exhibit controlled crystallization with heat treatment to a glass-ceramic structure with greater than 50 volume % crystallinity and high transparency. Compositions comprising zirconia and at least two alkaline earth metal oxides, including calcia, together with titania in excess of 60 wt-%, exhibit very high index of refraction values (e.g., greater than 2.30) after crystallization. Surprisingly, microspheres with index of refraction greater than 2.3, preferably greater than 2.35, exhibit retroreflective brightness that is substantially greater than (e.g., twice as great as) that of prior art glass-ceramic beads with index of refraction less than 2.30, when submerged in water. The combination of crystallinity in the form of a nanoscale glass-ceramic structure and index of refraction greater than 2.30, preferably greater than 2.35, more preferably greater than 2.40, provides beads that are useful as durable transparent retroreflective lens elements.

Microspheres of the present disclosure comprise at least two alkaline earth metal oxides in a total amount of at least 10 wt-%, wherein one of the alkaline earth metal oxides is calcia in an amount of at least 2 wt-% and one or more other alkaline earth metal oxides is present in a total amount of at least 5 wt-%. Useful alkaline earth metal oxides include baria (BaO), strontia (SrO), magnesia (MgO), or calcia (CaO). In certain preferred embodiments, the total amount of alkaline earth metal oxide(s) is at least 11 wt-% (e.g., 11 wt-%, 12 wt-%, 13 wt-%, 14 wt-%, 15 wt-%, 16 wt-%, 17 wt-%, 18 wt-%, 19 wt-%, 20 wt-%, 21 wt-%, 22 wt-%, 23 wt-%, 24 wt-%, 25 wt-%, 26 wt-%, 27 wt-%, 28 wt-%, 29 wt-%, 30 wt-%). Further, the total amount of alkaline earth metal oxide(s) typically ranges up to 35 wt-%. Many preferred embodiments contain less than 20% by weight alkaline earth metal oxides such as less than 15%. In some embodiments baria and calcia are included at about equal amount. Further, in some embodiments the total amount of alkaline earth metal oxide(s) is about twice that of zirconia. In one embodiment, the composition comprises an alkaline earth oxide component comprising or consisting of about 5 wt-% to about 10 wt-% of baria in combination with 5 wt-% to about 10 wt-% of calcia.

In the compositions in which the total content of more than one component is discussed, the beads may include only one of the components listed, various combinations of the components listed, or all of the components listed. For example, if a bead composition is said to include a total content of baria, strontia, magnesia, and calcia in an amount of 35% by weight, it can include 35% by weight of any one of these components or a combination of two, three or four of these components totaling 35% by weight.

Certain mixtures of alkaline earth modifiers are particularly useful for lowering the liquidus temperature and for aiding in glass formation during quenching. The melting and quenching properties imparted by the preferred alkaline earth mixtures are critical for achieving larger diameter beads (e.g., diameter greater than 100 microns, 150 microns, 200 microns) and for manufacturing the beads using easily achievable combustion-based flame temperatures (e.g., 1900° C., 2000° C., 2100° C.) and using air-quenching. With the addition of mixtures of alkaline earth metal oxides totaling at least 10 wt-%, including calcia in an amount greater than 2 wt-%, preferably at least 4 wt-%, more preferably at least 5 wt-%, the ability to quench beads into a clear glass is notably improved. Addition of magnesia also can result in improved crush strength, possibly by controlling crystallization during the heat treatment step and influencing the resulting microstructure. Too much alkaline earth metal oxide can result in poorer mechanical strength or poor chemical resistance to acidic environments.

Optionally, the beads of the disclosure preferably comprise up to 10 wt-% by weight zinc oxide (ZnO). Typically the amount of zinc oxide is less than about 10 wt-% (e.g., 9 wt-%, 8 wt-%, 7 wt-%, 6 wt-%, 5 wt-%, 4 wt-%, 3 wt-%, 2 wt-%, 1 wt-%). Glass-ceramic beads comprising a minor amount of zinc oxide can have the highest index of refraction values.

The microspheres may optionally include minor amounts (e.g., each typically less than 5 wt-%) of oxides of elements such as lithium ($Li_2O$), sodium ($Na_2O$), potassium ($K_2O$), aluminum ($Al_2O_3$), silicon ($SiO_2$), yttrium ($Y_2O_3$), tin ($SnO_2$), boron ($B_2O_3$), halfnium ($HfO_2$), germanium ($GeO_2$), phosphorous ($P_2O_5$), antimony ($Sb_2O_5$), molybdenum ($MoO_3$), tungsten ($WO_3$) and combinations thereof. Typically, the total amount of such inorganic oxide is less than 10 wt-%, although more may be present provided the presence thereof does not detrimentally impact the desired properties of the beads (e.g., index of refraction).

Specific metal oxides may be included for the improvement of mechanical properties. For example, one or metal oxides selected from the following group, typically in amounts of up to 5 wt-% each, can improve mechanical properties; $SiO_2$, $Al_2O_3$, $HfO_2$, $La_2O_3$, and $Y_2O_3$. For some such metal oxides, $Al_2O_3$ and $SiO_2$ for example, higher concentrations will tend to decrease the index of refraction undesirably.

The glass-ceramic microspheres of the disclosure comprise one or more crystalline phases, typically totaling at least 5 volume %. Crystallinity is typically developed though heat-treatment of amorphous beads, although some glass-ceramic beads according to the disclosure and formed by quenching molten droplets may contain crystals without secondary heat treatment. Such a crystalline phase or phases may include relatively pure single-component metal oxide phases of titania (e.g., anatase, rutile) and/or zirconia (e.g., baddeleyite). Also, such a crystalline phase or phases may include relatively pure multicomponent metal oxide phases (e.g., $ZrTiO_4$). Such a crystalline phase or phases may include crystalline solid solutions that are isostructural with relatively pure single-component or multicomponent metal oxide phases. Finally, such crystalline phase or phases may include at least one heretofore unreported crystalline phase, in terms of crystal structure and/or composition. The compositions exhibit controlled crystallization characteristics such that they remain transparent following heat treatments.

Colorants can also be included in the beads of the present disclosure. Such colorants include, for example, $CeO_2$, $Fe_2O_3$, $CoO$, $Cr_2O_3$, $NiO$, $CuO$, $MnO_2$, $V_2O_5$ and the like. Typically, the beads of the present disclosure include no more than about 5% by weight (e.g., 1%, 2%, 3%, 4%) colorant, based on the total weight of the beads (theoretical oxide basis). Also, rare earth elements, such as praseodymium, neodymium, europium, erbium, thulium, ytterbium may optionally be included for fluorescence. Preferably, the microspheres are substantially free of lead oxide (PbO) and cadmium oxide (CdO).

Glass microspheres according to the disclosure can be prepared by conventional processes as, for example, disclosed in U.S. Pat. No. 3,493,403 (Tung et al). In one useful process, the starting materials are measured out in particulate form, each starting material being preferably about 0.01 micron to about 50 microns in size, and intimately mixed together. The starting raw materials include compounds that form oxides upon melting or heat treatment. These can include oxides, (e.g., titania, bismite, zirconia, and alkaline earth metal oxide(s)), hydroxides, acid chlorides, chlorides, nitrates, carboxylates, sulfates, alkoxides, and the like, and the various combinations thereof. Moreover, multicomponent metal oxides such as calcium titanate ($CaTiO_3$) and barium titanate ($BaTiO_3$) can also be used.

The oxide mixture can be melted in a gas-fired or electrical furnace until all the starting materials are in liquid form. The liquid batch can be poured into a jet of high-velocity air. Beads of the desired size are formed directly in the resulting stream. The velocity of the air is adjusted in this method to cause a proportion of the beads formed to have the desired dimensions. Typically, such compositions have a sufficiently low viscosity and high surface tension.

Melting of the starting materials is typically achieved by heating at a temperature within a range of about 1500° C. to about 1900° C., and often at a temperature of, for example, of about 1700° C. A direct heating method using a hydrogen-oxygen burner or acetylene-oxygen burner, or an oven heating method using an arc image oven, solar oven, graphite oven or zirconia oven, can be used to melt the starting materials.

Alternatively, the liquid is quenched in water, dried, and crushed to form particles of a size desired for the final beads. The crushed particles can be screened to assure that they are in the proper range of sizes. The crushed particles can then be passed through a flame having a temperature sufficient to remelt and spheroidize the particles.

In a preferred method, the starting materials are first formed into larger feed particles. The feed particles are fed directly into a burner, such as a hydrogen-oxygen burner or an acetylene-oxygen burner or a methane-air burner, and then quenched in water (e.g., in the form of a water curtain or water bath). Feed particles may be formed by melting and grinding, agglomerating, or sintering the starting materials. Agglomerated particles of up to about 2000 microns in size (the length of the largest dimension) can be used, although particles of up to about 500 microns in size are preferred. The agglomerated particles can be made by a variety of well known methods, such as by mixing with water, spray drying, pelletizing, and the like. The starting material, particularly if in the form of agglomerates, can be classified for better control of the particle size of the resultant beads. Whether agglomerated or not, the starting material may be fed into the burner with the burner flame in a horizontal orientation. Typically, the feed particles are fed into the flame at its base. This horizontal orientation is desired because it can produce very high yields (e.g., 100%) of spherical particles of the desired level of transparency.

The procedure for cooling the molten droplets can involve air cooling or rapid cooling. Rapid cooling is achieved by, for example, dropping the molten droplets of starting material into a cooling medium such as water or cooling oil. In addition, a method can be used in which the molten droplets are sprayed into a gas such as air or argon. The resultant quenched fused beads are typically sufficiently transparent for use as lens elements in retroreflective articles. For certain embodiments, they are also sufficiently hard, strong, and tough for direct use in retroreflective articles. Typically, however, a subsequent heat treating step is desired to improve their mechanical properties. Also, heat treatment and crystallization lead to increases in index of refraction.

In a preferred embodiment, a bead precursor can be formed and subsequently heated. As used herein, a "bead precursor" refers to the material formed into the shape of a bead by melting and cooling a bead starting composition. This bead precursor is also referred to herein as a quenched fused bead, and may be suitable for use without further processing if the mechanical properties and transparency are of desirable levels. The bead precursor is formed by melting a starting composition containing prescribed amounts of raw materials (e.g., titanium raw material, optional raw materials), forming molten droplets of a predetermined particle size, and cooling those molten droplets. The starting composition is prepared so that the resulting bead precursor contains the desired raw materials in predetermined proportions. The particle size of the molten droplets is normally within the range of about 10 microns to about 2,000 microns. The particle size of the bead precursors as well as the particle size of the final transparent fused beads can be controlled with the particle size of the molten droplets.

In certain preferred embodiments, a bead precursor (i.e., quenched fused bead) is subsequently heated. Preferably, this heating step is carried out at a temperature below the melting point of the bead precursor. Typically, this temperature is at least about 750° C. Preferably, it is about 850° C. to about 1000° C., provided it does not exceed the melting point of the bead precursor. If the heating temperature of the bead precursor is too low, the effect of increasing the index of refraction or the mechanical properties of the resulting beads will be insufficient. Conversely, if the heating temperature is too high, bead transparency can be diminished due to light scattering from large crystals. Although there are no particular limitations on the time of this heating step to increase index of refraction, develop crystallinity, and/or improve mechanical properties, heating for at least about 1 minute is normally sufficient, and heating should preferably be performed for about 5 minutes to about 100 minutes. In addition, preheating (e.g., for about 1 hour) at a temperature within the range of about 600° C. to about 800° C. before heat treatment may be advantageous because it can further increase the transparency and mechanical properties of the beads.

The latter method of preheating is also suitable for growing fine crystal phases in a uniformly dispersed state within an amorphous phase. A crystal phase containing oxides of zirconium, titanium, etc., can also form in compositions containing high levels of zirconia or titania upon forming the beads from the melt (i.e., without subsequent heating). Significantly, the crystal phases are more readily formed (either directly from the melt or upon subsequent heat treatment) by including high combined concentrations of titania and zirconia (e.g., combined concentration greater than 80%).

Microspheres made from a melt process are characterized as "fused." Fully vitreous fused microspheres comprise a dense, solid, atomistically homogeneous glass network from which nanocrystals can nucleate and grow during subsequent heat treatment.

The crush strength values of the beads of the disclosure can be determined according to the test procedure described in U.S. Pat. No. 4,772,511 (Wood). Using this procedure, the beads demonstrate a crush strength of preferably at least about 350 MPa, more preferably at least about 700 MPa.

The durability of the beads of the disclosure can be demonstrated by exposing them to a compressed air driven stream of sand according to the test procedure described in U.S. Pat. No. 4,758,469 (Lange). Using this procedure, the beads are resistant to fracture, chipping, and abrasion, as evidenced by retention of about 30% to about 60% of their original reflected brightness.

Transparent fused beads according to the present disclosure are suitable for use for jewelry, abrasives, abrasion resistant coating coating as well as a wide variety of retroreflective articles. In some aspects, the beads are employed directly. Alternatively, or in combination with beads, reflective elements comprising a core (e.g., ceramic, polymeric) and beads of the present disclosure partially embedded in the core, such as described in U.S. Pat. Nos. 5,774,265 and 3,964,821, may be employed.

Reflective articles of the disclosure share the common feature of comprising the inventive beads and/or reflective element comprising such beads at least partially embedded in a binder material.

In some aspects, the beads and/or reflective elements are employed in liquid (e.g., pavement) marking applications wherein the beads and/or reflective elements are sequentially or concurrently dropped-on a liquified binder or compounded within a liquified binder. The liquidified binder may be a traffic paint such as described in U.S. Pat. Nos. 3,645,933; 6,132,132; and 6,376,574. Other binder materials include thermoplastics such as described in U.S. Pat. Nos. 3,036,928; 3,523,029; and 3,499,857; as well as two-part reactive binders including epoxies such as described in U.S. Pat. Nos. 3,046,851 and 4,721,743, and polyureas such as described in U.S. Pat. No. 6,166,106.

In other aspects, beads and/or reflective elements are employed in retroreflective sheeting including exposed lens, encapsulated lens, embedded lens, or enclosed lens sheeting. Representative pavement-marking sheet material (tapes) as described in U.S. Pat. No. 4,248,932 (Tung et al.), U.S. Pat. No. 4,988,555 (Hedblom); U.S. Pat. No. 5,227,221 (Hedblom); U.S. Pat. No. 5,777,791 (Hedblom); and U.S. Pat. No. 6,365,262 (Hedblom). In addition to pavement-marking sheet material, sheeting useful for retroreflective signs may incorporate microspheres of the present disclosure.

Pavement marking sheet material generally includes a backing, a layer of binder material, and a layer of beads partially embedded in the layer of binder material. The backing, which is typically of a thickness of less than about 3 mm, can be made from various materials, e.g., polymeric films, metal foils, and fiber-based sheets. Suitable polymeric materials include acrylonitrile-butadiene polymers, millable polyurethanes, and neoprene rubber. The backing can also include particulate fillers or skid resistant particles. The binder material can include various materials, e.g., vinyl polymers, polyurethanes, epoxies, and polyesters, optionally with colorants such as inorganic pigments, including specular pigments. The pavement marking sheeting can also include an adhesive, e.g., a pressure sensitive adhesive, a contact adhesive, or a hot melt adhesive, on the bottom of the backing sheet.

Pavement marking sheetings can be made by a variety of known processes. A representative example of such a process includes coating onto a backing sheet a mixture of resin, pigment, and solvent, dropping beads according to the present disclosure onto the wet surface of the backing, and curing the construction. A layer of adhesive can then be coated onto the bottom of the backing sheet.

Other applications for retroreflective sheeting or liquid marking materials incorporating beads of the disclosure include graphics and signing in marine settings, where wet reflectivity is desired. For example, applied graphics and signing on motorized watercraft, floating markers, or stationary shoreline structures may incorporate beads of the disclosure.

EXAMPLES

The following provides an explanation of the present disclosure with reference to its examples and comparative examples. Furthermore, it should be understood that the present disclosure is no way limited to these examples. All percentages are in weight percents, based on the total weight of the compositions, unless otherwise specified.

Example 1

19.4 g of zirconium oxide (commercially available from Z-TECH division of Carpenter Engineering Products, (Bow, N.H.) under the trade designation "CF-PLUS-HM"), 116.4 g of titanium oxide (commercially available from Kerr McGee (Oklahoma City, Okla.) under the trade designation "Kemira 110"), 19.4 g of bismuth trioxide (commercially available from Fisher Scientific (Fair Lawn, N.J.) under the trade designation "B-339"), 25.0 g of barium carbonate (commercially available from Chemical Products Corporation (Cartersville, Ga.) under the trade designation "Type S"), 34.6 g of calcium carbonate (commercially available from Akrochem Corporation (Akron, Ohio) under the trade designation "Hubercarb Q325"), and 30.4 g of ferric nitrate ($(Fe(NO_3)_3-9H_2O)$ commercially available from Fisher (Fair Lawn, N.J.) under the trade designation "110-500") were combined in a porcelain jar mill with 350 g of water and 1600 g of 1 cm diameter zirconium oxide milling media. The ingredients were combined in appropriate proportions for the preparation of beads with the following base composition:

58.2% $TiO_2$
9.7% $ZrO_2$
9.7% $Bi_2O_3$
9.7% BaO
9.7% CaO
3% $Fe_2O_3$

The slurry was milled for 24 hours and then dried overnight at 100° C. to yield a mixed powder cake with the components homogeneously distributed. After grinding with a mortar and pestle, dried and sized particles (<250 microns diameter) were fed into the flame of a hydrogen/oxygen torch (commercially available from Bethlehem Apparatus Company, Hellertown Pa. under the trade designation "Bethlehem Bench Burner PM2D Model-B"), referred to as "Bethlehem burner" hereinafter. The Bethlehem burner delivered hydrogen and oxygen at the following rates, standard liters per minute (SLPM):

|  | Hydrogen | Oxygen |
|---|---|---|
| Inner ring | 8.0 | 3.0 |
| Outer ring | 23.0 | 9.8 |
| Total | 31.0 | 12.8 |

The particles were melted by the flame and transported to a water quenching vessel. The quenched particles were dried and then passed through the flame of the Bethlehem burner a second time, where they were melted again and transported to the water quenching vessel. The beads were collected and examined using an optical microscope. They measured about 40 to 250 microns in diameter and a majority of the beads were clear and substantially free of defects (e.g., optically visible inclusions, bubbles). The measured index of refraction for the beads is given in Table 1. The index of refraction can be measured by the Becke method, which is disclosed in F. Donald Bloss, "An Introduction to the Methods of Optical Crystallography," Holt, Rinehart and Winston, N.Y., pp. 47-55 (1961), the disclosure of which is incorporated herein by reference.

The $Bi_2O_3$ was volatilized. Thus, the final bead composition was 64.5% $TiO_2$
10.7% $ZrO_2$
10.7% BaO
10.7% CaO
3.3% $Fe_2O_3$ The beads were black in appearance. They measured about 40 to 250 microns. The quenched black glass beads were placed in an alumina crucible and heated at a rate of 10° C./minute to 850° C., held at 850° C. for 1 hr, and then allowed to cool slowly with the furnace through natural dissipation of heat into the environment. The beads were removed from the furnace after cooling back to room temperature. After heat treatment, the beads were converted from a black appearance to a yellow appearance. The measured index of refraction of the beads is given in Table 1.

Example 2

Following the procedure set forth in example 1, a batch of beads was prepared using the following raw materials: 16 g of zirconium oxide (commercially available from Z-TECH division of Carpenter Engineering Products, (Bow, N.H.) under the trade designation "CF-PLUS-HM"), 130 g of titanium oxide (commercially available from Fisher Scientific (Fair Lawn, N.J.) under the trade designation "T315-500"), 18 g of bismuth trioxide (commercially available from Fisher Scientific (Fair Lawn, N.J.) under the trade designation "B-339"), 23.4 g of barium carbonate (commercially available from Chemical Products Corporation (Cartersville, Ga.) under the trade designation "Type S"), and 32.1 g of calcium carbonate (commercially available from Akrochem Corporation (Akron, Ohio) under the trade designation "Hubercarb Q325") were combined in a porcelain jar mill with 350 g of water and 1600 g of 1 cm diameter zirconium oxide milling media. The ingredients were combined in appropriate proportions for the preparation of beads with the following base composition:

65% $TiO_2$
9% $Bi_2O_3$
9% BaO
9% CaO
8% $ZrO_2$

The $Bi_2O_3$ was volatilized. Thus, the final bead composition was 71.4% $TiO_2$
9.9% BaO
9.9% CaO
8.8% $ZrO_2$ The quenched beads were placed in an alumina crucible and heated at a rate of 10° C./minute to 850° C., held at 850° C. for 1 hr, and then allowed to cool slowly with the furnace through natural dissipation of heat into the environment. The beads were removed from the furnace after cooling back to room temperature. After heat treatment, the beads remained substantially clear when viewed using an optical microscope. The measured index of refraction of the beads is given in Table 1.

Example 3

Following the procedure set forth in Example 1, a batch of beads was prepared using the following raw materials: 12 g of zirconium oxide (commercially available from Z-TECH division of Carpenter Engineering Products, (Bow, N.H.) under the trade designation "CF-PLUS-HM"), 140 g of titanium oxide (commercially available from Fisher Scientific (Fair Lawn, N.J.) under the trade designation "T315-500"), 16 g of bismuth trioxide (commercially available from Fisher Scientific (Fair Lawn, N.J.) under the trade designation "B-339"), 20.6 g of barium carbonate (commercially available from Chemical Products Corporation (Cartersville, Ga.) under the trade designation "Type S"), and 28.6 g of calcium carbonate (commercially available from Akrochem Corporation (Akron, Ohio) under the trade designation "Hubercarb Q325"). The ingredients were combined in appropriate proportions for the preparation of beads with the following base composition:

70% $TiO_2$
8% $Bi_2O_3$
8% BaO
8% CaO
6% $ZrO_2$

The $Bi_2O_3$ was volatilized. Thus, the final bead composition was 76.1% $TiO_2$
8.7% BaO
8.7% CaO
6.5% $ZrO_2$ The beads were examined using an optical microscope. They measured about 40 to 250 microns in diameter and a majority of the beads were clear and substantially free of defects (e.g., optically visible inclusions, bubbles).

The quenched beads were placed in an alumina crucible and heated at a rate of 10° C./minute to 850° C., held at 850° C. for 1 hr, and then allowed to cool slowly with the furnace through natural dissipation of heat into the environment. The beads were removed from the furnace after cooling back to room temperature. After heat treatment, the beads remained substantially clear when viewed using an optical microscope. The measured index of refraction of the beads is given in Table 1.

Example 4

Following the procedure set forth in Example 1, a batch of beads was prepared using the following raw materials: 24 g of zirconium oxide (commercially available from Z-TECH division of Carpenter Engineering Products, (Bow, N.H.) under the trade designation "CF-PLUS-HM"), 126 g of titanium oxide (commercially available from Fisher Scientific (Fair Lawn, N.J.) under the trade designation "T315-500"), 18 g of bismuth trioxide (commercially available from Fisher Scientific (Fair Lawn, N.J.) under the trade designation "B-339"), 20.6 g of barium carbonate (commercially available from Chemical Products Corporation (Cartersville, Ga.) under the trade designation "Type S"), and 28.6 g of calcium carbonate (commercially available from Akrochem Corporation (Akron, Ohio) under the trade designation "Hubercarb Q325"). The ingredients were combined in appropriate proportions for the preparation of beads with the following base composition:

63% $TiO_2$
12% $ZrO_2$
9% $Bi_2O_3$
8% BaO
8% CaO

The $Bi_2O_3$ was volatilized. Thus, the final bead composition was 69.2% $TiO_2$
13.2% $ZrO_2$
8.8% BaO
8.8% CaO The beads were examined using an optical microscope. They measured about 40 to 250 microns in diameter and a majority of the beads were clear and substantially free of defects (e.g., optically visible inclusions, bubbles).

The quenched beads were placed in an alumina crucible and heated at a rate of 10° C./minute to 850° C., held at 850° C. for 1 hr, and then allowed to cool slowly with the furnace through natural dissipation of heat into the environment. The beads were removed from the furnace after cooling back to room temperature. After heat treatment, the beads remained substantially clear when viewed using an optical microscope. The measured index of refraction of the beads is given in Table 1.

Example 5

Following the procedure set forth in Example 1, a batch of beads was prepared using the following raw materials: 20 g of zirconium oxide (commercially available from Z-TECH division of Carpenter Engineering Products, (Bow, N.H.) under the trade designation "CF-PLUS-HM"), 120 g of titanium oxide (commercially available from Fisher Scientific (Fair Lawn, N.J.) under the trade designation "T315-500"), 20 g of bismuth trioxide (commercially available from Fisher Scientific (Fair Lawn, N.J.) under the trade designation "B-339"), 25.7 g of barium carbonate (commercially available from Chemical Products Corporation (Cartersville, Ga.) under the trade designation "Type S"), and 35.7 g of calcium carbonate (commercially available from Akrochem Corporation (Akron, Ohio) under the trade designation "Hubercarb Q325"). The ingredients were combined in appropriate proportions for the preparation of beads with the following base composition:

60% $TiO_2$
10% $ZrO_2$
10% $Bi_2O_3$
10% BaO
10% CaO

The $Bi_2O_3$ was volatilized. Thus, the final bead composition was 66.7% $TiO_2$
11.1% $ZrO_2$
11.1% BaO
11.1% CaO The beads were examined using an optical microscope. They measured about 40 to 250 microns in diameter and a majority of the beads were clear and substantially free of defects (e.g., optically visible inclusions, bubbles).

The quenched glass beads were placed in an alumina crucible and heated at a rate of 10° C./minute to 850° C., held at 850° C. for 1 hr, and then allowed to cool slowly with the furnace through natural dissipation of heat into the environment. The beads were removed from the furnace after cooling back to room temperature. After heat treatment, the beads remained substantially clear when viewed using an optical microscope. X-ray diffraction analysis confirmed that the heat-treated beads were substantially crystalline. FIG. 2 is a plot of the X-ray diffraction data. The volume percentage crystallinity was estimated to be 60-70%. The measured index of refraction of the beads is given in Table 1.

Example 6

Following the procedure set forth in example 1, a batch of beads was prepared using the following raw materials: 14 g of zirconium oxide (commercially available from Z-TECH division of Carpenter Engineering Products, (Bow, N.H.) under the trade designation "CF-PLUS-HM"), 130 g of titanium oxide (commercially available from Kerr McGee (Oklahoma City, Okla.) under the trade designation "Kemira 110"), 24 g of bismuth trioxide (commercially available from Fisher Scientific (Fair Lawn, N.J.) under the trade designation "B-339"), 20.6 g of barium carbonate (commercially available from Chemical Products Corporation (Cartersville, Ga.) under the trade designation "Type S"), and 28.6 g of calcium carbonate (commercially available from Akrochem Corporation (Akron, Ohio) under the trade designation "Hubercarb Q325"). The ingredients were combined in appropriate proportions for the preparation of beads with the following base composition:

65% $TiO_2$
12% $Bi_2O_3$
8% BaO
8% CaO
7% $ZrO_2$

The $Bi_2O_3$ was volatilized. Thus, the final bead composition was 73.9% $TiO_2$
9.1% BaO
9.1% CaO
7.9% $ZrO_2$ The beads were examined using an optical microscope. They measured about 40 to 250 microns in diameter and a majority of the beads were clear and substantially free of defects (e.g., optically visible inclusions, bubbles).

The quenched beads were placed in an alumina crucible and heated at a rate of 10° C./minute to 850° C., held at 850° C. for 1 hr, and then allowed to cool slowly with the furnace through natural dissipation of heat into the environment. The beads were removed from the furnace after cooling back to room temperature. After heat treatment, the beads remained substantially clear when viewed using an optical microscope. The measured index of refraction of the beads is given in Table 1.

Example 7

Following the procedure set forth in example 1, a batch of beads was prepared using the following raw materials: 16 g of zirconium oxide (commercially available from Z-TECH division of Carpenter Engineering Products, (Bow, N.H.) under the trade designation "CF-PLUS-HM"), 126 g of titanium oxide (commercially available from Kerr McGee (Oklahoma City, Okla.) under the trade designation "Kemira 110"), 16 g of bismuth trioxide (commercially available from Fisher Scientific (Fair Lawn, N.J.) under the trade designation "B-339"), 20.6 g of barium carbonate (commercially available from Chemical Products Corporation (Cartersville, Ga.) under the trade designation "Type S"), and 19.7 g of calcium carbonate (commercially available from Akrochem Corporation (Akron, Ohio) under the trade designation "Hubercarb Q325"), 5 g of aluminum oxide (commercially available from ALCOA Industrial Chemicals, (Pittsburgh, Pa.) under the trade designation "16SG"), and 10 g of wollastonite ((Ca-$SiO_3$) powder, commercially from R.T. Vanderbilt (Norwalk, Conn.) under the trade designation "Vansil W-30"). The ingredients were combined in appropriate proportions for the preparation of beads with the following base composition:

63% $TiO_2$
8% $ZrO_2$
8% $Bi_2O_3$
8% BaO
8% CaO
2.5 wt % $Al_2O_3$
2.5 wt % $SiO_2$

The $Bi_2O_3$ was volatilized. Thus, the final bead composition was 68.5% $TiO_2$
8.7% $ZrO_2$
8.7% BaO
8.7% CaO
2.7 wt % $Al_2O_3$
2.7 wt % $SiO_2$ The beads were examined using an optical microscope. They measured about 40 to 250 microns in diameter and a majority of the beads were clear and substantially free of defects (e.g., optically visible inclusions, bubbles).

The quenched beads were placed in an alumina crucible and heated at a rate of 10° C./minute to 850° C., held at 850° C. for 1 hr, and then allowed to cool slowly with the furnace through natural dissipation of heat into the environment. The beads were removed from the furnace after cooling back to room temperature. After heat treatment, the beads remained substantially clear when viewed using an optical microscope. The measured index of refraction of the beads is given in Table 1.

Example 8

Following the procedure set forth in example 1, a batch of beads was prepared using the following raw materials: 20 g of zirconium oxide (commercially available from Z-TECH division of Carpenter Engineering Products, (Bow, N.H.) under the trade designation "CF-PLUS-HM"), 120 g of titanium oxide (commercially available from Kerr McGee (Oklahoma City, Okla.) under the trade designation "Kemira 110"), 20 g of bismuth trioxide (commercially available from Fisher Scientific (Fair Lawn, N.J.) under the trade designation "B-339"), 19.3 g of barium carbonate (commercially available from Chemical Products Corporation (Cartersville, Ga.) under the trade designation "Type S"), 26.8 g of calcium carbonate (commercially available from Akrochem Corporation (Akron, Ohio) under the trade designation "Hubercarb Q325"), 10 g of zinc oxide (commercially available from EM Science (Cherry Hill, N.J.) under the trade designation "ZX0090-1"). The ingredients were combined in appropriate proportions for the preparation of beads with the following base composition:

60% $TiO_2$
10% $ZrO_2$
10% $Bi_2O_3$
7.5% BaO
7.5% CaO
5% ZnO

The $Bi_2O_3$ was volatilized. Thus, the final bead composition was 66.7% $TiO_2$
11.1% $ZrO_2$
8.3% BaO
8.3% CaO
5.6% ZnO The beads were examined using an optical microscope. They measured about 40 to 250 microns in diameter and a majority of the beads were clear and substantially free of defects (e.g., optically visible inclusions, bubbles).

The quenched beads were placed in an alumina crucible and heated at a rate of 10° C./minute to 850° C., held at 850° C. for 1 hr, and then allowed to cool slowly with the furnace through natural dissipation of heat into the environment. The beads were removed from the furnace after cooling back to room temperature. After heat treatment, the beads remained substantially clear when viewed using an optical microscope. The measured index of refraction of the beads is given in Table 1.

Example 9

Following the procedure set forth in example 1, a batch of beads was prepared using the following raw materials: 120 g of titanium oxide (commercially available from KRONOS, (Cranbury, N.J.) under the trade designation "KRONOS 1000"), 26.6 g of bismuth trioxide (commercially available from Fisher Scientific (Fair Lawn, N.J.) under the trade designation "B-339"), 34.5 g of barium carbonate (commercially available from Chemical Products Corporation (Cartersville, Ga.) under the trade designation "Type S"), and 47.5 g of calcium carbonate (commercially available from Akrochem Corporation (Akron, Ohio) under the trade designation "Hubercarb Q325"). The ingredients were combined in appropriate proportions for the preparation of beads with the following base composition:

60% $TiO_2$
13.3% $Bi_2O_3$
13.3% BaO
13.3% CaO

The beads were examined using an optical microscope. They measured about 40 to 250 microns in diameter and a majority of the beads were clear and substantially free of defects (e.g., optically visible inclusions, bubbles). The quenched beads were placed in an alumina crucible and heated at a rate of 10° C./minute to 765° C., held at 765° C. for 30 min, and then allowed to cool slowly with the furnace through natural dissipation of heat into the environment. The beads were removed from the furnace after cooling back to room temperature. After heat treatment, the beads remained substantially clear when viewed using an optical microscope. X-ray diffraction confirmed the presence of at least one crystalline phase, with a total crystalline phase concentration of about 10 volume %. The measured index of refraction of the beads is given in Table 1.

The $Bi_2O_3$ was found to have volatilized. Thus, the final bead composition was 69.2% $TiO_2$
15.3% BaO
15.3% CaO Example 10

Following the procedure set forth in example 1, a batch of beads was prepared using the following raw materials: 126 g of titanium oxide (commercially available from Aldrich Chemical Company (Milwaukee, Wis.) under the trade designation "24, 857-6"), 28 g of bismuth trioxide (commercially available from Fisher Scientific (Fair Lawn, N.J.) under the trade designation "B-339"), 20.6 g of barium carbonate (commercially available from Chemical Products Corporation (Cartersville, Ga.) under the trade designation "Type S"), 28.6 g of calcium carbonate (commercially available from Akrochem Corporation (Akron, Ohio) under the trade designation "Hubercarb Q325"), and 19.9 g of strontium carbonate (commercially available from Aldrich Chemical Company (Milwaukee, Wis.) under the trade designation "28, 983-3"). The ingredients were combined in appropriate proportions for the preparation of beads with the following base composition:

63% $TiO_2$
14% $Bi_2O_3$
8% BaO
8% CaO
7% SrO

The beads were examined using an optical microscope. They measured about 40 to 250 microns in diameter and a majority of the beads were clear and substantially free of defects (e.g., optically visible inclusions, bubbles). The quenched beads were placed in an alumina crucible and heated at a rate of 10° C./minute to 750° C., held at 750° C. for 1 hr, and then allowed to cool slowly with the furnace through natural dissipation of heat into the environment. The beads were removed from the furnace after cooling back to room temperature. After heat treatment, the beads remained substantially clear when viewed using an optical microscope. X-ray diffraction confirmed the presence of at least one crystalline phase, with a total crystalline phase concentration of about 10 volume %. The measured index of refraction of the beads is given in Table 1.

The $Bi_2O_3$ was found to have volatilized. Thus, the final bead composition was 73.3% $TiO_2$
9.3% BaO
9.3% CaO
8.1% SrO

TABLE I

| Example | Index of Refraction |
|---------|---------------------|
| 1 | 2.39 |
| 2 | 2.39 |
| 3 | 2.41 |
| 4 | 2.34 |
| 5 | 2.37 |
| 6 | 2.43 |
| 7 | 2.35 |
| 8 | 2.43 |
| 9 | 2.30 |
| 10 | 2.30 |

The complete disclosures of all patents, patent documents, and publications are incorporated herein by reference as if individually incorporated. It will be appreciated by those skilled in the art that various modifications can be made to the above described embodiments of the disclosure without departing from the essential nature thereof. The disclosure is intended to encompass all such modifications within the scope of the appended claims.

What is claimed is:

1. Microspheres comprising a glass-ceramic structure where the microspheres are fused and comprise at least 60 wt-% titania, calcia, and at least one alkaline earth metal oxide other than calcia based on the total weight of the microspheres and have an index of refraction of at least 2.30.

2. The microspheres of claim 1 wherein the index of refraction is at least 2.35.

3. The microspheres of claim 1 wherein the index of refraction is at least 2.40.

4. The microspheres of claim 1 wherein the microspheres comprise a total content of titania, zirconia, and baria of at least 70 wt-% based on the total weight of the microspheres.

5. The microspheres of claim 1 wherein the microspheres comprise a total content of titania, zirconia, and baria of at least 80 wt-% based on the total weight of the microspheres.

6. The microspheres of claim 1 wherein the microspheres comprise a total content of titania, zirconia, and baria of at least 90 wt-% based on the total weight of the microspheres.

7. The microspheres of claim 1 wherein the microspheres are transparent.

8. The microspheres of claim 7 having diameter greater than 100 microns.

9. The microspheres of claim 7 having diameter greater than 150 microns.

10. The microspheres of claim 1 wherein the microspheres further comprise at least 5 wt-% zirconia.

11. The microspheres of claim 1 wherein the amount of calcia and at least one other alkaline metal oxide is at least 10 wt-%.

12. The microspheres of claim 1 wherein the calcia is present in an amount of at least 2 wt-%.

13. The microspheres of claim 1 wherein the microspheres comprise at least 4 wt-% calcia and at least 4 wt-% baria.

14. The microspheres of claim 1 wherein the microspheres comprise at least 4 wt-% calcia, at least 4 wt-% baria, and at least 4 wt-% strontia.

15. The microspheres of claim 1 wherein the amount of calcia and at least one other alkaline earth metal oxide ranges up to 35 wt-%.

16. The microspheres of claim 1 further comprising up to about 10 wt-% zinc oxide.

17. The microspheres of claim 1 wherein the microspheres comprise about 60 wt-% to about 75 wt-% of titania, about 5 wt-% to about 25 wt-% of zirconia, about 5 wt-% to about 15 wt-% baria, about 5 wt-% to about 15 wt-% calcia, and optionally up to about 5 wt-% zinc oxide.

18. The microspheres of claim 1 wherein the microspheres comprise about 65 wt-% to about 70 wt-% of titania, about 10 wt-% to about 20 wt-% of zirconia, about 5 wt-% to about 10 wt-% baria, about 5 wt-% to about 10 wt-% calcia, and optionally up to about 5 wt-% zinc oxide.

19. The microspheres of claim 1 wherein the microspheres comprise about 65 wt-% to about 70 wt-% of titania, about 10 wt-% to about 20 wt-% of zirconia, about 5 wt-% to about 12 wt-% baria, about 5 wt-% to about 12 wt-% calcia, and optionally up to about 5 wt-% zinc oxide.

20. The microspheres of claim 1 wherein the microspheres comprise about 65 wt-% to about 70 wt-% of titania, about 12 wt-% to about 18 wt-% of zirconia, about 6 wt-% to about 10 wt-% baria, about 6 wt-% to about 10 wt-% calcia, and optionally up to about 5 wt-% zinc oxide.

21. The microspheres of claim 1 wherein the microspheres comprise a glass-ceramic structure comprising nanoscale crystals.

22. The microspheres of claim 21 wherein the nanoscale crystals have dimensions less than about 100 nanometers.

23. The microspheres of claim 21 wherein the nanoscale crystals comprise at least 20 volume % of the microspheres.

24. The microspheres of claim 21 wherein the nanoscale crystals comprise at least 50 volume % of the microspheres.

25. The microspheres of claim 1 wherein said microspheres comprise crystals greater than about 100 nanometers in dimension and wherein said crystals comprise less than 20 volume % of the microspheres.

* * * * *